United States Patent [19]

Allen et al.

[11] Patent Number: 4,677,152
[45] Date of Patent: Jun. 30, 1987

[54] POLYMERIC COMPOSITIONS

[75] Inventors: Adrian Allen, North Yorkshire; David Farrar, West Yorkshire, both of England

[73] Assignee: Allied Colloids Limited, England

[21] Appl. No.: 766,096

[22] Filed: Aug. 15, 1985

[30] Foreign Application Priority Data

Aug. 15, 1984 [GB] United Kingdom ............... 8420963
Jan. 30, 1985 [GB] United Kingdom ............... 8502330

[51] Int. Cl.$^4$ ............................................. C08L 33/14
[52] U.S. Cl. ................................. 524/543; 524/555; 524/558
[58] Field of Search ................... 524/543, 555, 558

[56] References Cited

U.S. PATENT DOCUMENTS 3,331,801 7/1967 Osmond ............... 524/558
3,532,663 10/1970 Nicks ................... 524/558
3,925,295 12/1975 Osborn ................. 524/558
3,997,488 12/1976 Tsubuko ............... 524/558

Primary Examiner—Paul R. Michl
Attorney, Agent, or Firm—Jenner & Block

[57] ABSTRACT

A polymer of an ethylenically unsaturated monomer containing a pendant hydrophobic group and, optionally, other monomers such as (meth) acrylic acid, ethyl acrylate or acrylamide is provided as a stable, substantially anhydrous dispersion containing at least 40% by weight of the polymer in a continuous phase of a non-aqueous liquid. The polymer in the dispersion generally includes acid groups and is neutralized, preferably with ammonia or a volatile amine. The dispersion can be made by reverse phase polymerization of an aqueous blend of monomers, followed by dehydration, or by making the polymer from a water insoluble blend of monomers by oil in water emulsion polymerization, dispersing the resultant oil in water emulsion into the non-aqueous liquid, and then dehydrating. The monomer including the hydrophobic group is preferably an allyl ether.

22 Claims, No Drawings

POLYMERIC COMPOSITIONS

Polymers that are formed from water soluble monomers are frequently made by reverse phase polymerisation to yield a stable water in oil dispersion of the polymer. It is well known to dehydrate this dispersion. A typical disclosure of such processes is in EP No. 126528.

It is well known to form polymers from a mixture of monomers one of which includes a pendant hydrophobic group that contain at least one hydrocarbyl group of at least eight carbon atoms. Such groups, especially when carried by an alkoxy chain, tend to create association between adjacent polymer molecules. Frequently other monomers used for the production of such polymers include materials such as ethyl acrylate which is substantially water insoluble. Examples of disclosures of such polymers are GB Nos. 1,167,524, 1,273,552, U.S. Pat. Nos. 4,138,381, 4,268,641 4,384,096, 4,463,151 and EP Nos. 13836 and 109820. It has been proposed to make them by precipitation polymerisation (GB No. 1,167,524) or solution polymerisation (U.S. Pat. No. 4,138,381) but in most instances they are made by conventional emulsion polymerisation, i.e., by emulsifying water insoluble monomers into water and polymerising to form an emulsion of the desired polymer. The normal solids content is generally about 30% in practice and is difficult to increase it by reducing the amount of water, because this will either destabilise the emulsion or render it unacceptably viscous or both.

The monomer that includes hydrophobic groups is often made from a surfactant and so it would be expected to affect significantly the stability of any polymer emulsion formed from it. Accordingly serious instability problems would be expected whenever the surfactant is of a type opposite to that required for stability.

In U.S. Pat. No. 4,524,175 (not published until after the priority date of this invention) a water in oil emulsion of an acrylamide/dodecyl methacrylate copolymer is made by a special reverse phase polymerisation wherein the dodecyl methacrylate is dissolved in the oil phase, instead of the aqueous phase, and an oil soluble initiator is used instead of the conventional water soluble initiator. Again the total polymer content of the emulsion is rather low (32.5% in the examples).

Polymers having the described pendant hydrophobic groups are often required to include acid groups such that the polymers are water insoluble and relatively non swellable when in the free acid form but water swellable when the acid groups are in salt form, neutralised with a base. Such polymers are of particular value as, for instance, thickeners for printing pastes or paints. The polymer is, as mentioned, generally supplied as an oil in water emulsion of the free acid form of the polymer and the user dilutes the emulsion to the desired concentration and adds base in order to achieve maximum thickening effect. The base cannot be added before the dilution as otherwise the composition becomes so viscous that it is unhandlable. See for instance EP No. 109820A1 page 20 lines 1 to 15. It is also proposed, at page 19 line 27, to provide the neutralised copolymer in a dry state, for instance by spray drying, but this involves the traditional problems of aggregation that occur when a water swellable or soluble powder is added to water. Also, at page 23 line 4, it is proposed to form a water-in-oil concentrate by dispersing into oil containing a low HLB surfactant an emulsion of the polymer in water together with ammonia. However this does not seem to have proved successfully commercially.

For many purposes, for instance in many printing pastes, the preferred bases are ammonia or volatile amines and so the present methods of using polymers containing acidic monomers and having pendant hydrophobic groups has necessitated the user handling the volatile base. This commercially is very inconvenient.

It is often desirable, when forming a printing paste or other thickened composition, to premix the thickener with other components before adding all the liquid vehicle. However many of the components that might be premixed in this manner cannot satisfactorily be mixed with the relatively dilute aqueous compositions that are available at present.

It is generally preferred to supply the polymer in liquid form, rather than powder form, but the only manner of presenting the polymers satisfactorily as liquids is as oil in water emulsions of solids content of about 30%, or much less if the polymer contains acid groups and is neutralised. It would be desirable to be able to provide the polymer in much more concentrated liquid form.

According to the invention we provide a dispersion in a continuous liquid phase of a polymer that is formed by polymerising (a) 1 to 100% by weight ethylenically unsaturated monomer containing a pendant hydrophobic group of at least 8 carbon atoms (b) 0 to 99% other ethylenically unsaturated monomer and the dispersion is stable, substantially anhydrous and contains at least 40% by weight of the polymer and the continuous liquid phase is a non aqueous liquid.

By saying that the dispersion is substantially anhydrous we mean that the amount of water is generally below 25% and preferably below 15% by weight of the polymer in the dispersion and preferably the amount of water in the polymer particles is not more than, and is preferably less than, the amount they would have if exposed to the ambient atmosphere.

The dispersions of the invention all contain at least 40% dry weight of the polymer, by weight of the dispersion and usually contain at least 45%. The amount of polymer may be up to, for instance, about 70 or 75%. Preferred dispersions contain from 45 to 60% by weight.

The dispersions of the invention thus solve the problems discussed above and in particular provide the valuable polymers in the form of a concentrate of high activity (above 40%) that is readily miscible with a wide variety of other additives.

An important preferred feature of the invention is the inclusion of a polymeric suspension stabiliser in order to promote stability of the dispersion.

Suitable suspension stabilisers include amphiphathic copolymers of hydrophobic monomers with hydrophilic monomers and which are soluble or dispersible in liquids of low polarity. The preferred stabilisers are either completely soluble or form fine dispersions in the continuous phase but are substantially insoluble in the monomer solution. These are typified by copolymers of alkyl acrylates or methacrylates with acrylic or methacrylic acid and copolymers of alkyl acrylates or methacrylates with dialkyl amino alkyl-(generally dimethyl aminoethyl)-acrylate methacrylate or quaternary ammonium or acid salt derivatives of these amino monomers. The most suitable of these are copolymers of alkyl methacrylates, where the alkyl group is a linear hydrocarbon of 12–18 carbon atoms, with methacrylic acid or trimethyl-beta-methacryloxyethyl-ammonium chloride and terpolymers with methyl methacrylate and hydroxyethylacrylate. Any of the stabilisers described in BP No. 1,482,515, U.S. Pat. 4,339,371 and EP No. 126528 may be used.

The choice of stabiliser is influenced by the particular copolymer. The stabilisers for polymers containing acidic groups are preferably cationic and those for polymers containing cationic groups, are preferably anionic.

The amount of suspension polymerisation stabiliser used is dependent on the size range of polymer particles required because at least a mono-layer absorbed at the interface between the polymer particle and the continuous phase is required to stabilise the dispersion. Generally the amount of stabiliser is from 0.5 to 20%, preferably 2 to 10%, based on the weight of the anhydrous dispersion when, as is preferred, the particle size is to be small, for instance below 5 microns and generally in the range 0.2 to 2 or 3 microns. If larger particles are satisfactory then lower amounts of stabiliser, for instance 1 to 5%, may be satisfactory. The stabiliser is often introduced into the dispersion while aqueous, in which event the amount is generally 0.5 to 10%, preferably 1 to 5%, based on the weight of aqueous dispersion.

The polymers are preferably copolymers and the invention is of particular value when the monomer (b) includes acidic monomer (optionally with other monomer) and the polymer is substantially water insoluble and non-swellable when in free acid form but is a water soluble or swellable, thickening, polymer when in alkali metal, ammonium or amine salt form. The dispersion may be provided initially with the acidic groups wholly or mainly in the free acid form, in which event base will be added before use to convert the groups to salt form whilst in the dispersion.

Preferred dispersions are those in which the polymer includes acid groups which are neutralised with the result that the user does not have to add alkali, even though the dispersion is of satisfactorily low viscosity.

Neutralisation can be with an alkali metal such as potassium or, preferably sodium or with a non-volatile amine but preferably the acid groups are neutralised with ammonia or a volatile amine. Suitable volatile amines include mono and di and tri $C_{1-4}$ alkyl amines, the alkyl group preferably being methyl or ethyl. By saying that the amine is volatile we mean that it is capable of evaporating, when a film formed from the composition is exposed to the atmosphere, in order that the polymer reverts to the free acid form. In the neutralised dispersion sufficient of the acid groups must be neutralised in order that the polymer exerts the desired thickening effect and this generally requires at least 50% and preferably at least 75% of the groups being in salt form. Generally 100% of the groups are in salt form.

The dispersion of the invention may be made by emulsifying into the non-aqueous liquid either the polymer or monomers from which the polymer may be obtained. This non-aqueous liquid may be the same liquid as the non-aqueous liquid in the final dispersion or the emulsification may be effected in one liquid and then some or all of the liquid may be removed or replaced by other non-aqueous liquid during the manufacture of the final dispersion.

To facilitate the emulsification, and the formation of the desired particle size, it is often convenient to include a small amount of a water-in-oil, low HLB, emulsifier so as to reduce the amount of shear that has to be applied to achieve a given particle size. The low HLB emulsifier will have HLB below 7, and generally 4 to 6 and typical emulsifiers are sorbitan monostearate, sorbitan monooleate, glyceryl monostearate and various ethoxylated fatty alcohols. It is usually soluble in the non-aqueous liquid. The amount of low HLB emulsifier is preferably below about 3% by weight based on the weight of the final dry dispersion. The emulsification is generally conducted at a stage when the dispersion contains water, in which event the amount of low HLB emulsifier is generally below 1.5 or 2%, typically 0.1 to 0.8%, by weight based on the weight of the aqueous dispersion.

The substantially anhydrous dispersion is preferably made by forming an aqueous dispersion of polymer in non-aqueous liquid and then dehydrating the dispersion in known manner, generally by azeotropic distillation, preferably under reduced pressure. The dehydration is conducted for a sufficient time that the final product has the desired low water content. If the polymer includes acid groups the polymer may be neutralised before or after dehydration but if it is neutralised before dehydration (e.g., before or during formation of the dispersion of aqueous polymer in non aqueous liquid) it may be necessary to add more base after dehydration to ensure complete neutralisation in the final dispersion, particularly if neutralisation was with a volatile base.

The non-aqueous liquid in the initial aqueous dispersion is usually a blend of volatile and non-volatile oils, the volatile oil being removed during the azeotropic distillation. It may be replaced by further non-aqueous liquid. Suitable non-aqueous liquids may be selected from aromatic and aliphatic hydrocarbons and halogenated hydrocarbons, for instance as discussed in EP No. 126528.

One way of making the aqueous dispersion is to start with a conventional polymer-in-water emulsion, for instance as made by a method described in EP No. 109820, and to emulsify this into a non-aqueous liquid, polymeric stabiliser and, generally, a small amount of a low HLB emulsifying agent in order to form a dispersion in the non-aqueous liquid of aqueous polymer particles having the desired small particle size. When the polymer includes acid groups, these will be in free acid form in the polymer-in-water emulsion and the emulsification into the non aqueous liquid may be conducted in the presence base.

Another way of making the aqueous dispersion is by reverse phase polymerisation of the monomers while dissolved in water and dispersed in oil, any acid monomers preferably being present as salt.

When the polymer includes acid groups, instead of forming an aqueous dispersion of neutralised polymer-in-oil it is also possible to form a substantially anhydrous dispersion of acidic polymer in oil and then to add base to this. This anhydrous dispersion may be formed by emulsifying an emulsion of water insoluble polymer-in-water into non-aqueous liquid, using polymeric stabiliser, followed by dehydration of the emulsion, generally by azeotroping. Alternatively the monomers, in acid form, may be dissolved in non-aqueous liquid and then polymerised to cause precipitation of the acid polymer in oil. Addition of ammonia or other base converts the resultant substantially dry dispersion of water insoluble polymer-in-oil into the desired product of the invention.

One preferred method of the invention involves reverse phase polymerisation of an aqueous blend of the monomers, any acid monomers preferably being in salt form, followed by azeotropic distillation. The monomer a preferably includes a polyoxyethylene chain, as discussed below, in order to improve its solubility in the aqueous monomer blend. The other monomers in the blend are preferably all water soluble. The polymerisation initiator is preferably water soluble. A small amount of cross linking agent may be included in order that the final polymer is water swellable rather than water soluble.

The reverse phase polymerisation process may be a reverse phase emulsion polymerisation process, in which event it is conducted in the presence of a substantial amount of water-in-oil, low HLB, emulsifier, but preferably the process is a reverse phase suspension polymerisation process. Accordingly low HLB emulsifier is present, if at all, merely to facilitate the attainment of the desired small droplet size and typically is present in an amount less than about 3% by weight of non aqueous liquid.

It is surprising that it is possible to conduct the reverse phase polymerisation process successfully since the monomer a is generally a reaction product of a surfactant having HLB above 8 with an unsaturated compound such as an acid, nitride, halide, ester amine or alcohol and so would be expected to destabilise the dispersion before, during or after polymerisation. The reaction of the unsaturated compound with the surfactant is preferably conducted using conditions such that the product is free of unreacted surfactant. The final monomer is preferably free of hydrophilic groups such as unblocked acid, salt, amine, amide or hydroxyl groups.

The monomer (a) is preferably an ethylenically unsaturated monomer including a group $-B_nA_mR$ where A is propoxy or butoxy, B is ethoxy ($CH_2CH_2O$), n is zero or, preferably a positive integer generally above 5, often above 10 and preferably 20 to 100 and m is generally zero but, if n is a positive number, m can be a smaller positive number. Thus a polyoxyethylene chain may be interrupted by oxypropylene groups. By appropriate choice of the value of n, m, and the group R it is possible to control the solubility of the monomer and the properties of the final polymer.

R is a hydrophobic group containing at least 8 carbon atoms. It can be a polyoxyalkylene chain where the alkylene groups wholly or mainly are propylene or higher but preferably is a hydrocarbyl group.

The hydrocarbyl group generally contains from 8 to 30, preferably 10 to 24 and most preferably 12 to 18 carbon atoms. It may be selected from alkyl, for instance octyl, lauryl or stearyl, alkaryl such as ethyl benzene ($-C_2H_4Ph$), aryl such as naphthyl, aralkyl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and aralkyl groups. Any of these groups may additionally be substituted provided the substituents do not render the pendant group hydrophilic to an extent that the desired improvement in properties due to the hydrophobic group is lost.

The monomer may be a (meth) acrylic or (meth) allylic monomer. The linkage between the ethylenically unsaturated carbon atom of the monomer and the group $-B_nA_mR$ is generally a chain of at least two, and often at least four atoms and often includes one or more amide, amine, ether or ester groups within the chain. The monomer may be di or polyfunctional, e.g., a derivative of itaconic acid, in which event both acid groups may be substituted by $-B_nA_mR$ or one may be unsubstituted or substituted by a different esterifying group, for instance methyl or higher alkyl, e.g., butyl.

Preferred monomers are (meth) allylic ethers and amides or esters of ethylenically unsaturated carboxylic acids preferably acrylamide, acrylic acid, methacrylic acid, maleic acid or itaconic acid. In esters, the group may be bonded direct to the carboxylic group of the ethylenically unsaturated acid or may be bonded to an esterifying group that may include an amino group or one or more ether or ester linkages. For instance the group R may be a quaternising group in, for instance, the amino group of an amino alkyl esterifying group. In amides the group $-A_mB_nR$ may be bonded to a nitrogen atom of the amide or may be bonded to the nitrogen atom of an aminoalkyl group bonded to amide nitrogen, for instance as a quaternising group. Preferably the monomer (a) is a compound formed by reacting allyl chloride or alcohol or an appropriate ethylenically unsatured acid or nitrile halide or ester with a surfactant, preferably a hydroxyl terminated surfactant, preferably having HLB above 8.

Preferred monomers (a) are compounds of the formula $$R^1CH=C(R^2)QB_nA_mR$$

where
$R = C_8-C_{30}$ alkyl or aralkyl,
$R^1 = COOR^3$ or $QB_nA_mR$ when $R^2=H$ and 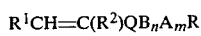 $Q \neq CH_2O$ or $R^1=H$
$R^2 = H$ or $CH_3$ or
$R^2 = CH_2COOR^3$ and $Q \neq CH_2O$
$R^2 = CH_2QB_nA_mR$ and $Q \neq CH_2O$
$R^3 = H$ or $C_1-C_8$ alkyl
$Q = O$ when $R^1$ and $R^2$ are H or $Q=CH_2O$, COO or $CONR^4$ where $R^4 = H$ or $CH_3$, or $COOR^5N^+(R^3)_2.R.X^{31}$ where $R^5 = C_1-C_8$ alkyl optionally substituted by hydroxyl, e.g.,

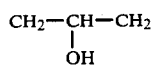

and $X^- =$ anion, e.g., $Cl^- Br^-$ or $CH_3SO_4^-$
or, when n, m=O, $Q=CONR^4(R^5)N^+(R^3)_2$ $X^-$ where $R^3$, $R^4$, $R^5$, and $X^-$ are as above; or $COO(R^5)OOC$ or $COO(R^5)COO$ where $R^5$ is as above; or $COO(R^5)OOC(R^5)N^+(R^3)_2.X^-$ or $COO(R^5)COO(R^5)N^+(R^3)_2.X^-$ where R, $R^3$, $R^5$ and $X^-$ are as above.

A suitable example of RX that can be used for quaternising is stearyl chloride.

The (meth)allyl ethers are particularly preferred and give polymers having a particularly good combination of performance, rheology, linearity and stability properties during use. It is very surprising that they are so good since all the recent developments in associative polymers including hydrophobic groups have used acrylic monomers and the allyl polymers proposed in GB Nos. 1,167,524 and 1,273,552 appear to have been unsuccessful commercially, possibly because of the form in which they were produced.

The allyl ethers may be made by, for instance, reacting an appropriate surfactant alcohol with sodium or sodium alkoxide to form the sodium derivative and then reacting this with allyl chloride, or by reacting allyl alcohol with the surfactant alcohol with or without catalyst.

Compounds in which Q is COOR$^5$COO may be made by reacting, e.g., acrylic acid with a hydroxycarboxylic acid followed by esterification with surfactant alcohol, or by reacting a hydroxyalkyl ester of acrylic acid with the half ester of succinic anhydride with a surfactant alcohol. Compounds in which Q includes COOR$^5$OOC may be made by forming a half ester of a dicarboxylic acid and a surfactant alcohol, and reacting this, an unsaturated acid and a diol.

All the other described monomers are described in the quoted patents can be obtained by routine methods.

The amount of monomer (a) will be at least 1% by weight and may be up to, for instance 90% by weight but generally is from 1 to 50% and preferably 5 to 25% by weight.

The comonomer (b) is ethylenically unsaturated and generally is free of polyalkyleneoxide chains or other substituents creating a chain of longer than about 12 (preferably less than 6) chain atoms and should be free of a hydrophobic group that will tend to create association between molecules. Any of the monomers conventionally used for making water or alkali soluble or swellable polymers may be used, for instance as are described in, for instance, GB Nos. 1,167.524, 1,273,552, U.S. Pat. Nos. 4,138,381, 4,268,641, 4,384,096, 4,463,151 and EP No. 13836, 63018 and 109820. The amounts described herein may be used. Particularly preferred monomers include alkyl (meth)acrylate (especially ethyl acrylate) in amounts of, e.g., 20 to 50%, acrylamide in amounts of, e.g., 5 to 95% and, especially acidic monomer (often blended with either acrylamide or alkyl acrylate).

The acidic monomer is generally one or more unsaturated sulphonic or carboxylic acids, preferably acrylic monomers such as acrylic acid, methacrylic acid, 2-acrylamido-2-methylpropane sulphonic acid or itaconic acid. The amount of acidic monomer is usually at least 10 and preferably at least 20% by weight of the monomers and often is in the range 30 to 80% or 95%.

If the polymer is to be made by reverse phase polymerisation the monomer blend should be water soluble and so the optional monomers will generally consist of water soluble monomers such as acrylamide but if the polymer is to be made by oil in water emulsion polymerisation the optional monomers should be water insoluble, for instance alkyl acrylate.

If it is desired to cross link the polymer then the optional monomer will include a cross linking monomer, generally a diethylenically unsaturated monomer such as methylene bis acrylamide or diallyl phthalate, in an amount such that the polymer has the desired degree of swellability. The amount is usually below 1%, typically from 0.005 to 0.1% by weight.

Preferred monomers (b) are (meth)acrylic acid alone or with acrylamide or with ethyl acrylate, optionally with cross linking agent.

In order to promote distribution of the substantially anhydrous dispersion in water an oil in water emulsifying agent may be included in the dispersion or in the water to which it is added. This emulsifying agent may be a water soluble or oil soluble surfactant and generally has HLB from 8 to 11.5.

The following are examples of the invention.

EXAMPLE 1

A diester was formed between itaconic acid and the 10 mole ethoxylate of stearyl alcohol by direct esterification in the presence of sulphuric acid.

A copolymer was formed by reverse phase suspension polymerisation of this ester with ammonium acrylate. In particular, an aqueous phase was formed of 144 parts acrylic acid, 7 parts of the diester, 213 parts water, 81 parts 31.6% aqueous ammonia and traces of methylenebis-acrylamide and AZDN. A non-aqueous liquid phase was formed of 15 parts SPAN 80 (trade mark), 42 parts of a 30% solution in SBAP11 of polymeric stabiliser (a copolymer of 2 moles cetostearyl methacrylate with 1 mole methacrylic acid), 117 parts Pale Oil 150 and 149 parts SBP11. Polymerisation was allowed to proceed in the usual way and the resulting inverse emulsion was dehydrated by distilling off water and SBP11 under reduced pressure to a final pressure of 10 mm/hg and at a temperature of 95° C.

The resulting anhydrous dispersion had a polymer content of about 50% and was an effective thickener, for instance in printing pastes.

EXAMPLE 2

115.2 parts of acrylic acid, 28.8 parts of acrylamide, 2.3 parts of a 9 mole ethylene oxide condensate of nonylphenol acrylate (a water soluble derivative), 220 parts of water, 65 parts 32% aqueous ammonia, 0.4 parts of Tetralon B (trade mark), 0.04 parts of AZDN and 0.04 parts of methylene bis-acrylamide were mixed to form an aqueous phase. A non-aqueous liquid phase was formed of 15 parts Span 80, 42 parts of a 30% w/w solution of a 1:2 molar copolymer of cetostearyl methacrylate:methacrylic acid in SBP11, 117 parts of Pale Oil 150 and 149 parts of SBP11. The aqueous phase was homogenised into the oil phase, deoxygenated and polymerised using 0.043 parts of sodium metabisulphite and 0.043 parts of tertiary butyl hydroperoxide. The resulting inverse dispersion of hydrated polymer gel was dehydrated by distillation under reduced pressure to a final pressure of 10 mm of mercury at a temperature of 95° C.

The resulting anhydrous dispersion had a polymer content of about 50% and was an effective thickener.

EXAMPLE 3

181.8 parts of a 79.2% solution of acrylic acid in water, 0.4 parts of Tetralon B, 5.8 parts of the allyl ether of a 10 mole ethoxylate of stearyl alcohol, 118 parts of water, 0.0424 parts of A2DN and 116 parts of a 29.9% solution of ammonia in water were mixed to form an aqueous solution. A non-aqueous liquid phase was formed from 7.4 parts of Span 80, 42.4 parts of a 30% solution in SBP11 of an inverse dispersion stabiliser (copolymer of 2 moles cetostearyl methacrylate with 1 mole of methacrylic acid), 127.3 parts of Pale Oil 60 and 145.7 parts of SBP11.

The aqueous phase was homogenised into the oil phase, deoxygenated and polymerised using 0.042 parts of sodium metabisulphite dissolved in 2.058 parts of water and tertiary butyl hydroperoxide added continuously as a 0.5% solution in water at a rate of 0.14 parts per minute. The resulting inverse dispersion of hydrated polymer was distilled as in example 2 to yield a dehydrated concentration polymer dispersion to which was added 2 parts of a 5 mole ethoxylate of nonyl phenol and 1 part of a 4 mole ethoxylate of a broad cut lauryl alcohol per 100 parts of concentrated dehydrated dispersion. This formed a dispersion of 50% active copolymer which dispersed with agitation in water to yield a highly viscous polymer solution with the characteristic 'soap gel' rheology of associated water soluble polymers. The polymer was a useful flocculant for clay particles in water or sodium hydroxide solution.

EXAMPLE 4

The process of Example 3 was repeated where the aqueous phase contained in addition 0.063 parts of methylene bis acrylamide as bi-functional crosslinking comonomer. The resultant dehydrated polymer particles swelled in water to form a highly viscous but non-viscoelastic paste useful as a vehicle for printing textiles and other articles particularly on cloth containing residual electrolyte where pastes thickened with conventional polyammonium acrylate microgel latices give holoing, bleading or flushing or print colour.

EXAMPLE 5

A copolymer of 85 parts of acrylamide and 15 parts of the allyl ether of a 10 mole ethoxylate of stearyl alcohol was prepared by inverse dispersion polymerisation.

Thus an aqueous solution containing 120.7 parts of acrylamide, 0.83 parts of Tetralon B, 269.6 parts of water, 21.3 parts of the above allyl ether and 0.043 parts of A2DN with the pH adjusted to 5 was homogenised into an oil phase containing 7.3 parts of Span 80, 41.4 parts of the stabiliser solution of Example 3, 108.9 parts of Pale Oil 60 and 157.2 parts of ABP11. The monomer solution dispersion was deoxygenated and polymerised using 4.1 parts of a 0.1% solution of tertiary butyl hydroperoxide in water using 10 parts of a 5 mole ethoxylate of nonylphenol per 100 parts of dehydrated polymer dispersion. The product dispersed in water to form a solution of 'soap gel' rheology characteristic of associated polymer solutions which was unaffected by mono or multivalent electrolytes. These polymer solutions were found to be effective flocculants for clay suspensions in water and as rheology modifiers for printing pastes.

EXAMPLE 6

200 grams of a 30% active copolymer-in-water latex sold under the trade name "Primal TT615" (believed to be a copolymer of 40% methacrylic acid, 50% ethylacrylate and 10% of an ester formed between an unsaturated acid and an ethoxylated surfactant) was homogenised into an oil phase comprising 7.0 grams of Span 80, 23.3 grams of a 30% active solution of a 2:1 molar copolymer of ceto-stearyl methacrylate:hydroxyethylmethacrylate in SBP11, 39.2 grams of Pale Oil 60 and 96.0 grams of SBP11. The resulting inverse emulsion was then dehydrated by distilling off water and SBP11 under reduced pressure to a final pressure of 10 mm.Hg and a temperature of 95° C.

The resulting anhydrous polymer-in-oil dispersion was activated by mixing in 5.6 grams of Ethylan D254 to produce a self-emulsifiable liquid polymer-in-oil dispersion having 50% active solids.

Upon addition of a stoichiometric excess of ammonia to the dispersion a product is formed that can be added to a printing paste, in the absence of further base, to act as an effective thickener.

Primal, Span and Ethylan are trade marks.

EXAMPLE 7

The process of Example 6 can be repeated but using, instead of the latex "Primal TT615", a latex formed by oil in water emulsion polymerisation using ammonium persulphate of 40 parts by methacrylic acid, 50 parts by weight ethyl acrylate and 10 parts by weight of a surfactant diester formed from allyl chloride and the reaction produce of polyoxyethylene (10 moles) stearyl ether with sodium methoxide. Upon addition of this dry dispersion to deionised water or 0.5% NaCl solution to form a 2% solution, the Brookfield viscosity at spindle 6 is 352,000 or 480,000 cps respectively at 2.5 rpm and 28,000 or 35,000 cps at 100 rpm.

EXAMPLE 8

The process of Example 6 can be repeated using an emulsion made by oil in water emulsion polymerisation of 46 g methacrylic acid, 51 g ethyl acrylate and 17 g of the product obtained by heating succinic anhydride with polyoxyethylene (10 moles) stearyl ether at 125° C. for 30 minutes and then condensing the reaction product in the presence of a polymerisation inhibitor with 2-hydroxy ethyl acrylate.

We claim:

1. A dispersion in a continuous liquid phase of a polymer that is formed by polymerising (a) 1 to 100% by weight ethylenically unsaturated monomer containing a group $-B_nA_mR$ where B is ethoxy, n is a positive integer of at least 2, A is propoxy or butoxy, m is zero or an integer less than n, and R is a hydrophobic group of at least 8 carbon atoms and (b) 0 to 99% other copolymerisable ethylenically unsaturated monomer by a polymerisation technique selected from reverse phase polymerisation and oil-in-water emulsion polymerisation and in which the dispersion is stable, substantially anhydrous and contains at least 40% by weight of the polymer, and the continuous liquid phase is a non-aqueous liquid.

2. In a dispersion of a polymer in a non-aqueous liquid and that is stable, substantially anhydrous and contains at least 40% by weight of the polymer the improvement in which the polymer has been formed by copolymerising (a) 1 to 100% by weight ethylenically unsaturated monomer containing a group $-B_nA_mR$ where B is ethoxy, n is a positive integer of at least 2, A is propoxy or butoxy, m is zero or an integer less than n, and R is a hydrophobic group of at least 8 carbon atoms and (b) 0 to 99% other copolymerisable ethylenically unsaturated monomer by a polymerisation technique selected from reverse phase polymerisation and oil-in-water emulsion polymerisation.

3. A dispersion according to claim 1 in which the monomer (b) is present and includes acidic monomer, the polymer is substantially water insoluble and non-swellable when in free acid form but is a water soluble or swellable thickening polymer when in alkali metal, ammonium or amine salt form, and in which the polymer in the dispersion is in alkali metal, ammonium, or amine salt form.

4. A dispersion according to claim 1 in which monomer (b) is present and is an acidic monomer and the polymer is neutralised with ammonia or volatile amine.

5. A dispersion according to claim 1 including a suspension stabiliser that is an amphipathic copolymer of hydrophilic and hydrophobic monomers.

6. A dispersion according to claim 1 including a high HLB oil-in-water emulsifier.

7. A method of making a stable anhydrous dispersion in a non-aqueous liquid of a polymer formed by polymerising (a) 1 to 100% by weight ethylenically unsaturated monomer containing a group —$B_nA_mR$ where B is ethoxy, n is a positive integer of at least 2, A is propoxy or butoxy, m is zero or an integer less than n, and R is a hydrophobic group of at least 8 carbon atoms and (b) 0 to 99% other copolymerisable ethylenically unsaturated monomer, the method comprising forming an aqueous dispersion of the polymer in the non-aqueous liquid by a polymerisation technique selected from (1) reverse phase polymerisation of a water soluble blend of monomers in the non-aqueous liquid to form the aqueous dispersion and (2) oil-in-water emulsion polymerisation of a water insoluble blend of monomers and dispersion of the resultant emulsion into the non-aqueous liquid, and wherein the amount of polymer is at least 40% based on the combined weight of polymer and non-aqueous liquid, and then dehydrating the aqueous dispersion to form a stable substantially anhydrous dispersion containing at least 40% by weight of the polymer in the non-aqueous liquid.

8. A dispersion according to claim 1 in which monomer a is an amide of ester of an ethylenically unsaturated acid or a meth(allyl)ether and monomer b is an acrylic monomer.

9. A dispersion according to claim 1 in which the monomer (a) has the formula $CH_2{=}CR'CH_2OB_nA_mR$ where R' is H or Me, A is propoxy or butoxy, B is ethoxy, n is a positive integer of from 2 to 100, m is zero or an integer less than n, R is a hydrophobic group of at least 8 carbon atoms.

10. A dispersion according to claim 1 in which the monomer (b) is (meth)acrylic acid alone or blended with acrylamide or ethyl acrylate, optionally with a cross linking agent.

11. A process of making a stable anhydrous dispersion comprising forming a stable dispersion in non-aqueous liquid of an aqueous blend of ethylenically unsaturated monomer and polymerising by reverse phase polymerisation to form a stable dispersion of aqueous polymer in the non-aqueous liquid and dehydrating the dispersion to form a stable anhydrous dispersion containing at least 40% by weight of the polymer, characterized in that the monomer comprises (a) 1 to 100% by weight ethylenically unsaturated monomer containing a group —$B_nA_mR$ where B is ethoxy, n is a positive integer of at least 2, A is propoxy or butoxy, m is zero or an integer less than n, and R is a hydrophobic group of at least 8 carbon atoms and (b) 0 to 99% other copolymerisable ethylenically unsaturated monomer.

12. A process according to claim 11 in which the monomer (a) is the ester or amide of an ethylenically unsaturated acid, or (meth)allyl ether, with a hydroxy terminated surfactant of HLB above 8.

13. A process of making a stable dispersion in a continuous liquid phase of a polymer obtained by copolymerising (a) ethylenically unsaturated monomer containing a group —$B_nA_mR$ where B is ethoxy, n is a positive integer of at least 2, A is propoxy or butoxy, m is zero or an integer less than n, and R is a hydrophobic group of least 8 carbon atoms and (b) other copolymerisable ethylenically unsaturated monomer including acidic monomer characterized in that the polymer is formed from a water insoluble blend of the monomers by oil in water emulsion polymerisation while the acidic monomer is in free acid form and the oil in water emulsion is then dispersed into non-aqueous liquid to form an aqueous dispersion of polymer in the non-aqueous liquid, the aqueous dispersion is then dehydrated to form a stable, substantially anhydrous dispersion containing at least 40% by weight of the polymer, and the acidic groups are converted to alkali metal, ammonium or amine form during or after forming the aqueous dispersion.

14. A process according to claim 11 or claim 13 in which the aqueous dispersion of polymer includes a suspension stabiliser that is an amphipathic copolymer of hydrophilic and hydrophobic monomers.

15. A process according to claim 11 or claim 13 in which monomer a has the formula $CH_2{=}CR'CH_2OB_nA_mR$ where R' is H or Me, A is propoxy or butoxy, B is ethoxy, n is a positive integer of from 2 to 100, m is zero or an integer less than n, R is a hydrophobic group of at least 8 carbon atoms.

16. A dispersion according to claim 1 in which n is an integer greater than 5.

17. A dispersion according to claim 2 in which n is an integer greater than 5.

18. A process according to claim 11 in which n is an integer greater than 5.

19. A process according to claim 13 in which n is an integer greater than 5.

20. A process according to claim 7 in which the polymer was formed from a water insoluble blend of monomers by oil in water emulsion polymerisation and the aqueous dispersion was formed by dispersing this emulsion into non-aqueous liquid.

21. A process according to claim 7 in which n is an integer greater than 5.

22. A dispersion according to claim 1 in which the polymer is made by oil-in-water emulsion polymerisation.

* * * * *